(12) United States Patent
Klein et al.

(10) Patent No.: US 10,696,130 B2
(45) Date of Patent: Jun. 30, 2020

(54) WARM AIR CHANNEL OUTLET CONTROL DEVICE

(71) Applicant: Hanon Systems, Daejeon (KR)

(72) Inventors: Torsten Klein, Troisdorf (DE); Detlef Handwerk, Köln (DE); Antonio Marques Ferreira, Königswinter (DE); Ralph Wiesmann, Euskirchen (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/383,205

(22) Filed: Dec. 19, 2016

(65) Prior Publication Data

US 2017/0174043 A1  Jun. 22, 2017

(51) Int. Cl.
  *B60H 1/00* (2006.01)
  *B60S 1/02* (2006.01)
  *B60S 1/54* (2006.01)

(52) U.S. Cl.
  CPC .......... *B60H 1/00678* (2013.01); *B60S 1/023* (2013.01); *B60S 1/54* (2013.01); *B60H 2001/00721* (2013.01)

(58) Field of Classification Search
  CPC ...... B60H 1/00064; B60H 2001/00721; B60H 1/00678; B60S 1/023; E06B 7/02; E06B 7/04

(Continued)

(56) References Cited

U.S. PATENT DOCUMENTS 1,972,274 A * 9/1934 Quinlan ................... E06B 7/06
                                                      454/212
2,396,876 A * 3/1946 Olsen ........................ F23J 13/08
                                                      454/24

(Continued)

FOREIGN PATENT DOCUMENTS

CN    101898497 A   12/2010
DE    19649512 A1   6/1998

(Continued)

OTHER PUBLICATIONS

Park, et al., KR1020050111251A English machine translation, Nov. 24, 2005.*

(Continued)

*Primary Examiner* — Edelmira Bosques
*Assistant Examiner* — Phillip Decker
(74) *Attorney, Agent, or Firm* — Shumaker, Loop & Kendrick, LLP; James D. Miller (57) ABSTRACT

A heating and air conditioning system for a motor vehicle including a housing having an air outlet, a heating heat exchanger disposed inside the housing with a warm air path to heat air flowing therethrough, a warm air duct having a warm air intake opening and a warm air duct discharge opening disposed downstream of the heating heat exchanger channeling a partial flow of warm air from the warm air path to the air outlet, and a mode control damper rotatable about a rotational axis and connected downstream of the warm air duct in terms of flow, wherein the air outlet may be selectively opened completely or partially, and in a closed state may be partially or completely closed. The mode control damper functions simultaneously as the control damper for controlling the volume of air exiting the warm air duct discharge opening.

10 Claims, 9 Drawing Sheets

(58) Field of Classification Search
USPC .......................................................... D23/371
See application file for complete search history.

(56) References Cited

U.S. PATENT DOCUMENTS

| | | | | |
|---|---|---|---|---|
| 2,535,933 | A | * | 12/1950 | Kubatzky .................. E06B 7/02 454/225 |
| 3,541,945 | A | * | 11/1970 | Wexler .................... F23L 17/02 251/65 |
| 4,255,928 | A | * | 3/1981 | Jones .................... F01N 13/085 454/2 |
| 4,671,171 | A | * | 6/1987 | Brill ...................... F01N 13/085 454/2 |
| 4,903,484 | A | * | 2/1990 | Yates ..................... B60K 13/04 60/316 |
| 5,137,491 | A | * | 8/1992 | Ishihara .................. B60H 1/247 454/152 |
| 5,305,823 | A | * | 4/1994 | Elliot ................. B60H 1/00021 137/896 |
| 5,482,507 | A | * | 1/1996 | Priest .................... F24F 13/075 34/235 |
| 6,695,691 | B1 | * | 2/2004 | Le ...................... B60H 1/00678 454/121 |
| 6,889,761 | B2 | * | 5/2005 | Perry ................. B60H 1/00678 165/103 |
| 6,921,327 | B2 | * | 7/2005 | Urash .................... B60K 13/04 454/4 |
| 7,491,119 | B2 | * | 2/2009 | Han .................... B60H 1/00007 454/156 |
| 8,302,669 | B2 | * | 11/2012 | Kiel .................... B60H 1/00685 165/42 |
| 8,544,533 | B2 | * | 10/2013 | Lee .................... B60H 1/00064 165/202 |
| 8,721,408 | B2 | * | 5/2014 | Ikeda .................. B60H 1/00064 165/203 |
| 2003/0201096 | A1 | * | 10/2003 | Perry ................. B60H 1/00678 165/202 |
| 2004/0192185 | A1 | * | 9/2004 | Le ...................... B60H 1/00064 454/156 |
| 2006/0027354 | A1 | * | 2/2006 | Vincent .............. B60H 1/00028 165/42 |
| 2006/0154592 | A1 | * | 7/2006 | Wawzyniak ....... B60H 1/00685 454/121 |
| 2007/0062683 | A1 | * | 3/2007 | Tarukawa .......... B60H 1/00678 165/202 |
| 2007/0204985 | A1 | | 9/2007 | Fukagawa et al. |
| 2008/0200110 | A1 | * | 8/2008 | Ghosh ................ B60H 1/00671 454/160 |
| 2010/0167635 | A1 | * | 7/2010 | Gotoh ................ B60H 1/00064 454/121 |
| 2010/0263828 | A1 | * | 10/2010 | Chikagawa ........ B60H 1/00028 165/59 |
| 2010/0304654 | A1 | * | 12/2010 | Kakizaki ............ B60H 1/00064 454/121 |
| 2013/0231036 | A1 | * | 9/2013 | Kim ................... B60H 1/00064 454/121 |
| 2015/0291000 | A1 | * | 10/2015 | Wiesmann .......... B60H 1/0005 454/160 |
| 2015/0306935 | A1 | * | 10/2015 | Shichiken ........... B60H 1/0005 165/47 |
| 2015/0343877 | A1 | * | 12/2015 | Capellmann ....... B60H 1/00028 454/160 |
| 2015/0354127 | A1 | * | 12/2015 | Ott .......................... D06F 58/20 34/235 |
| 2016/0159193 | A1 | * | 6/2016 | Laux ................... B60H 1/0005 454/126 |

FOREIGN PATENT DOCUMENTS

| | | | |
|---|---|---|---|
| DE | 10127339 A1 | 12/2002 | |
| DE | 102007013432 A1 | 9/2008 | |
| DE | 102008033882 A1 | 1/2010 | |
| DE | 102014102402 A1 | 9/2014 | |
| EP | 1306241 A1 | 5/2003 | |
| EP | 1462282 A1 * | 9/2004 | ......... B60H 1/00671 |
| JP | H09207581 A | 8/1997 | |
| JP | 2002029245 A | 1/2002 | |
| JP | 2006131220 A | 5/2006 | |
| JP | 2008087576 A | 4/2008 | |
| JP | 2010070173 A | 4/2010 | |
| JP | 2010274911 A | 12/2010 | |
| KR | 20050111251 A | 11/2005 | |
| KR | 1020050111251 A * | 11/2005 | |
| KR | 101503895 B1 * | 3/2015 | |

OTHER PUBLICATIONS

Nishiyama et al., JP 2010-70173A English machine translation, Apr. 2, 2010 (Year: 2010).*

Raimann, DE 19649512 A1 English machine translation, Jun. 4, 1998 (Year: 1998).*

* cited by examiner

Fig. 1

Prior Art

WARM AIR CHANNEL OUTLET CONTROL DEVICE

CROSS-REFERENCE TO RELATED PATENT APPLICATIONS

This patent application claims the benefit of German Patent Application No. 10 2015 122 348.1 filed Dec. 21, 2015. The disclosure of the above patent application is hereby incorporated herein by reference in its entirety.

FIELD OF THE INVENTION

The invention relates to a heating and air conditioning system for a motor vehicle. This system comprises a housing having one or more air outlets, at least one heating heat exchanger and/or one heater, which is/are disposed inside the housing and over which a warm air path extends so that air flowing through the warm air path is heated as it passes across the heating heat exchanger and/or the heater. The heating and air conditioning system further comprises a warm air duct having a warm air intake opening and a warm air duct discharge opening, which is disposed downstream of the heating heat exchanger and/or the heater for the purpose of channeling a partial air flow of warm air from the warm air path to one of the air outlets, and a mode control damper, which is rotatable about a rotational axis and is connected downstream of the warm air duct in terms of flow, and by means of which the at least one air outlet can be selectively opened completely or partially, and in a closed state can be partially or completely closed.

BACKGROUND OF THE INVENTION

Warm air ducts typically supply warm air to one or more outlets of an air conditioning system. The air from the warm air duct usually is not controlled based on the mode-dependent volume of air being delivered to the outlets that are supplied with air. In other words, the volume of warm air channeled through the warm air duct does not change when the mode is changed. This leads to the problem that, in a mode in which the volume of diverted air is small, the corresponding outlet becomes much too warm.

Warm air ducts supply warm air, for example, to the defrost outlet of the heating and air conditioning system for the purpose of de-icing the windshield. The volume of warm air channeled through the warm air duct is determined by the cross-section of the warm air duct, and must be adjusted to a level that will ensure that, even in the most unfavorable case, sufficient warm air is conveyed to an outlet, typically to the defrost outlet. This generally applies to the defrost mode, in which a large volume of air is required for defrosting, but a similar volume of air is also required in the direction of the floor, and a small volume may also be required in the direction of the dashboard. If the defrost outlet has only a small opening cross-section, then depending on the mode, for example in footwell mode, the defrost outlet will become too warm because the amount of air coming from the warm air duct is not reduced in accordance with the generally diminished volume of air going to the defrost outlet.

Numerous different arrangements of warm air ducts in air conditioning systems are known from the prior art. DE 101 27 339 A1 describes a heating, ventilating and/or air conditioning system in particular for a motor vehicle, which has a distribution case in which at least two air flow paths up to a mixing zone can be defined and which is equipped with at least two outlets, at least one of which can be supplied with air from the mixing zone. The apparatus comprises a device connected downstream of the mixing zone in terms of flow, which reduces, more specifically substantially excludes any interaction of the air exiting the mixing zone with air that is moving in a different direction, by the formation, for example, of duct-like passages that permit an uncoupled crossing of air flows. In the heating, ventilating and/or air conditioning apparatus a device may also be provided, for example, that enables air to be diverted from one of the definable flow paths in order to supply air that is moving in a direction that is different from the direction of the air exiting the mixing zone. This device can provide a selective and/or adjustable diversion. Thus it is possible, for example, to divert warm air that is intended for channeling toward the windshield out of a flow path, and to feed the remaining portion of warm air to the mixing zone.

DE 1 96 49 512 A1 describes a heating or air conditioning system for a vehicle, said system comprising a housing which has an inlet opening through which fresh air and/or recirculated air can be fed as intake air, a warm air duct in which a heating element is disposed, a cold air duct with a mixing chamber in which the warm air flow channeled through the warm air duct and the cold air flow channeled through the cold air duct are mixed, a plurality of outlet openings through which the mixed air flow is channeled to the corresponding outlet nozzles, air control elements for controlling the volume of air passing through the warm air duct, the cold air duct and the outlet openings, and an additional duct for conducting a partial air flow to an outlet opening. This additional duct is designed to be closeable by means of an air control element (defroster damper) assigned to the outlet opening (defroster outlet opening). The additional duct may be embodied as a duct extension that extends from an outlet region of the warm air duct directly into the region of a defroster damper.

DE 10 2007 013 432 A1 describes a warm air duct for an air conditioning apparatus of a motor vehicle which may have various air outlets, wherein the warm air duct comprises at least one warm air intake opening through which warm air can be received, and at least one warm air duct discharge opening through which warm air can be delivered to the air outlets of the air conditioning apparatus. In this case, at least one divider is disposed above the at least one warm air duct discharge opening in such a way that the warm air duct discharge opening is divided at least into a first discharge opening region and a second discharge opening region. In addition, warm air is received in the region of a heat exchanger through at least one warm air intake opening of the warm air duct, this warm air then exiting the warm air duct through the individual discharge opening regions, whereby the warm air exiting the warm air duct through the warm air duct discharge opening is divided into at least two warm air partial flows, each of which supplies warm air to respectively assigned air outlets of the air conditioning apparatus.

However, the volume of warm air passing through the warm air duct does not change when the mode is changed. This leads to the problem that, in operating modes that require a low volume of diverted air, the corresponding outlets can become much too warm. The current solution to this problem involves conducting air outside of the warm air duct to the outlets in such a way as to enable a suitable mixture of cold and warm air to be achieved, based on the mode. (The closest prior art).

The object of the invention is to improve the temperature behavior of an outlet which is supplied with air from a separate warm air duct.

SUMMARY OF THE INVENTION

The object of the invention is achieved by means of a heating and air conditioning system as disclosed herein.

A heating and air conditioning system for a motor vehicle, according to the invention, comprises
- a housing having one or more air outlets,
- at least one heating heat exchanger and/or one heater, which is/are disposed inside the housing and across which a warm air path extends, so that air flowing through the warm air path is heated as it passes the heating heat exchanger and/or the heater,
- a warm air duct having a warm air intake opening and a warm air duct discharge opening, which is disposed downstream of the heating heat exchanger and/or the heater for the purpose of channeling a partial air flow of warm air from the warm air path to one of the air outlets, and
- a mode control damper, which is rotatable about a rotational axis and is connected downstream of the warm air duct in terms of flow, and by means of which the at least one air outlet may be selectively opened completely or partially, and in a closed state may be partially or completely closed.

The mode control damper and the warm air duct are arranged such that the mode control damper is designed to also function simultaneously as the control damper for the volume of air exiting through the warm air duct discharge opening. According to the invention, the mode control damper has two lateral segments, spaced from one another on its side that faces the warm air duct discharge opening, in other words the inner side, which segments are configured, positioned and aligned in such a way that they block the flow of air outward and inward parallel to the axis of rotation in the region of the warm air duct discharge opening, over the entire adjustment range of the mode control damper. The lateral segments thus block both a flow of warm air parallel to the axis of rotation and out of the warm air duct and a flow of cold air parallel to the axis of rotation and into the region of the warm air duct discharge opening. If cold air were to flow parallel to the axis of rotation and into the region of the warm air duct discharge opening, the discharge of warm air from the warm air duct discharge opening, which flows substantially perpendicular to the axis of rotation, could be impeded and in the worst case even blocked.

According to the design of the present invention, the mode control damper of an air outlet and the warm air duct discharge opening are thus designed and disposed in such a way that the mode control damper is able to control the volume of air exiting the warm air duct to the corresponding outlet. The advantage of the invention is that it therefore enables the temperature of an outlet to which air from the warm air duct can be supplied to be controlled dependent on the mode. The invention involves an optimization of a warm air duct combined with a mode control damper whereby the temperature layering function of a heating and air conditioning system can be improved. The features of the invention can be implemented easily and without substantial added cost.

There are two different preferred embodiments for the solution according to the invention. In both embodiments, segments on the mode door, preferably formed as circular segments, prevent warm air from flowing out parallel to the axis of rotation. As mentioned above, this applies to the entire adjustment range of the mode control damper. The outlet of the warm air duct is configured accordingly.

According to one advantageous embodiment, the warm air duct discharge opening extends in a direction from the rotational axis of the mode control damper up to an opposing sealing edge against which the mode control damper rests in the closed state. The warm air duct discharge opening of the warm air duct thus preferably extends between the rotational axis of the mode control damper and a housing wall of the housing. The segments of the mode control damper are preferably positioned and aligned in such a way that, as the mode control damper rotates, they pass outside of the warm air duct alongside walls of the warm air duct which are disposed opposite one another and are oriented perpendicular to the axis of rotation.

According to the second preferred embodiment, the warm air duct discharge opening extends alongside walls of the warm air duct, which are disposed opposite one another and are oriented perpendicular to the axis of rotation, from a first housing side up to a second, opposite housing side of the housing. In this case, the lateral segments are attached and positioned on the mode control damper in such a way that, as the mode control damper rotates about the rotational axis, the segments move in cutouts in the side walls of the warm air duct at the warm air duct discharge opening, each of the cutouts being formed as complementary to the lateral segments. This can be achieved, for example, by designing the lateral segments in the form of circular segments and the complementary cutouts in the side walls of the warm air duct at the warm air duct discharge opening as half-moon shaped, and by the circular segments then moving in the cutouts as the mode control damper rotates.

The mode control damper and/or the warm air duct may have one or more openings, and/or a small distance may be provided between the warm air duct discharge opening and the mode control damper in the closed state, either of which will result in the warm air duct discharge opening not being completely closed even when the mode control damper is in the closed state. Even when the mode control damper is closed, the design according to the invention will operate with constant ventilation due to the openings or the distance between the warm air duct discharge opening and the mode control damper. It is therefore unnecessary for the warm air duct to be completely closed.

According to one embodiment of the invention, at least one baffle plate is formed at the warm air duct for conducting a portion of the air flow from the warm air duct so as to bypass the mode control damper.

According to a further embodiment of the invention, the intermediate space between the two lateral segments at a warm air duct is provided with a filler. Alternatively, the space between the two adjacent lateral segments may be filled by a depression on the opposite side of the mode control damper.

The warm air duct is preferably provided for supplying warm air to the defrost outlet. In other words, in this case the mode control damper is the defroster damper.

BRIEF DESCRIPTION OF THE DRAWINGS

Additional details, features and advantages of embodiments of the invention will be apparent from the following description of embodiment examples, with reference to the attached set of drawings. The drawings show.

DETAILED DESCRIPTION OF THE INVENTION

Figure 1:
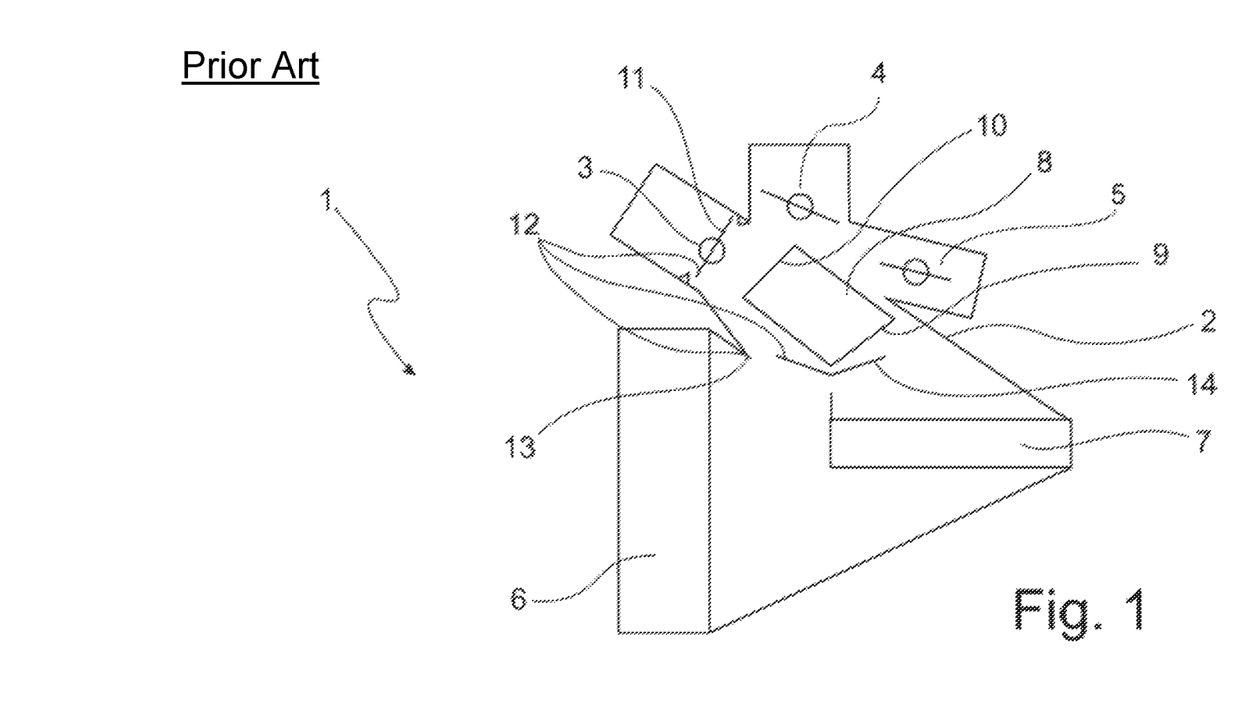
FIG. 1: a heating and air conditioning system with a warm air duct, according to the prior art.

FIG. 1 shows a heating and air conditioning system 1 according to the prior art. This system comprises a housing 2 having one air inlet and three air outlets 3, 4, 5. In FIG. 1, a defrost outlet 3, a dashboard outlet 4 and a foot well outlet 5 are illustrated schematically. The incoming air is conducted across an evaporator 6, which cools the air. Connected downstream of evaporator 6 in terms of flow is a heating heat exchanger 7, across which a portion of the air that was previously cooled by evaporator 6 flows. Another portion of the cooled air is conducted past heating heat exchanger 7, rather than across it. In other words, a warm air path extends across heating heat exchanger 7 toward air outlets 3, 4, 5 and a cold air path extends directly toward air outlets 3, 4, 5, bypassing the heating heat exchanger.

Inside housing 2, a separate warm air duct 8 having a warm air duct intake opening 9 and a warm air duct discharge opening 10 is positioned, this separate duct being disposed downstream of heating heat exchanger 7 and conducting a partial flow of air from the warm air path toward defrost outlet 3.

FIG. 1 illustrates the foot mode as the operating mode. In this mode, defrost outlet 3 is nearly closed by a rotatable defroster damper 11 as the mode control damper 11. In this case, warm air duct 8 typically supplies the same volume of warm air as is required in another mode in which a large quantity of warm air from warm air duct 8 is required, for example in the defrost/foot mode. In the foot mode, in which no warm air is required at the windshield, the temperature at defrost outlet 3 would then be too high. To control the temperature, means 12 for controlling the air flow such as baffle plates 13 on housing 2 and temperature dampers 14 and mode control dampers 11 are provided in order to conduct cold air toward the appropriate outlet that has become too warm, in this case toward defrost outlet 3. This is highly complex, since these measures also impact the other modes.

The heating and air conditioning system according to the invention, specifically the assembly comprising the mode control damper and the warm air duct that supplies warm air in the direction of one of the outlets, has a number of exemplary embodiments. In these embodiments, the volume of warm air coming from warm air duct discharge opening 10 can be controlled based on mode control damper 11.

Figure 2:
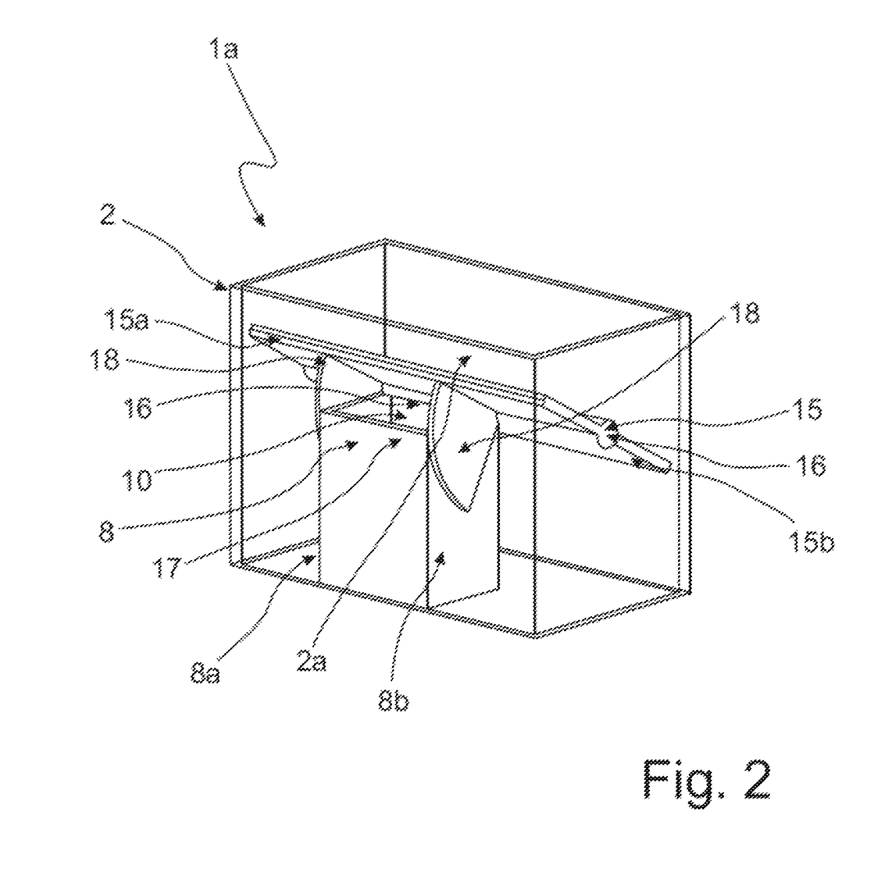
FIG. 2: a portion of a heating and air conditioning system according to the invention, having a warm air duct and a mode control damper.

FIG. 2 shows a first exemplary embodiment of the region 1a of housing 2 of a heating and air conditioning system that comprises warm air duct 8 and a mode control damper 15 designed according to the invention. Mode control damper 15 is designed to be rotatable about a rotational axis 16, with the door leaf of the mode control damper according to FIG. 2 having two sections 15a, 15b on the two sides of rotational axis 16. In the embodiment shown, warm air duct discharge opening 10 extends in a direction from rotational axis 16 of mode control damper 15 up to the opposite sealing edge 17 of the warm air duct in the region of housing wall 2a of housing 2, against which edge the mode control damper 15 rests in the closed state. In addition, two circular segment-shaped lateral segments 18 are attached to mode control damper 15, these lateral segments 18 being positioned on mode control damper 15 in such a way that, as mode control damper 15 rotates, the segments pass outside of the warm air duct along two side walls 8a, 8b of the warm air duct 8 which are disposed opposite one another and are oriented perpendicular to rotational axis 16. The circular segment-shaped lateral segments 18 each extend radially from the region of rotational axis 16 up to an outer edge of mode control damper 15. Even when mode control damper 15 is open, the two lateral segments 18 of mode control damper 15 prevent a flow of air parallel to rotational axis 16 at the warm air duct discharge opening 10 in the region of the two opposing side walls 8a, 8b of warm air duct 8. The assembly shown in FIG. 2 enables the cross-section that determines the volume of warm air exiting warm air duct 8 to be controlled. The width of warm air duct 8 is adjusted based on the warm air flow volume required.

Figure 3:
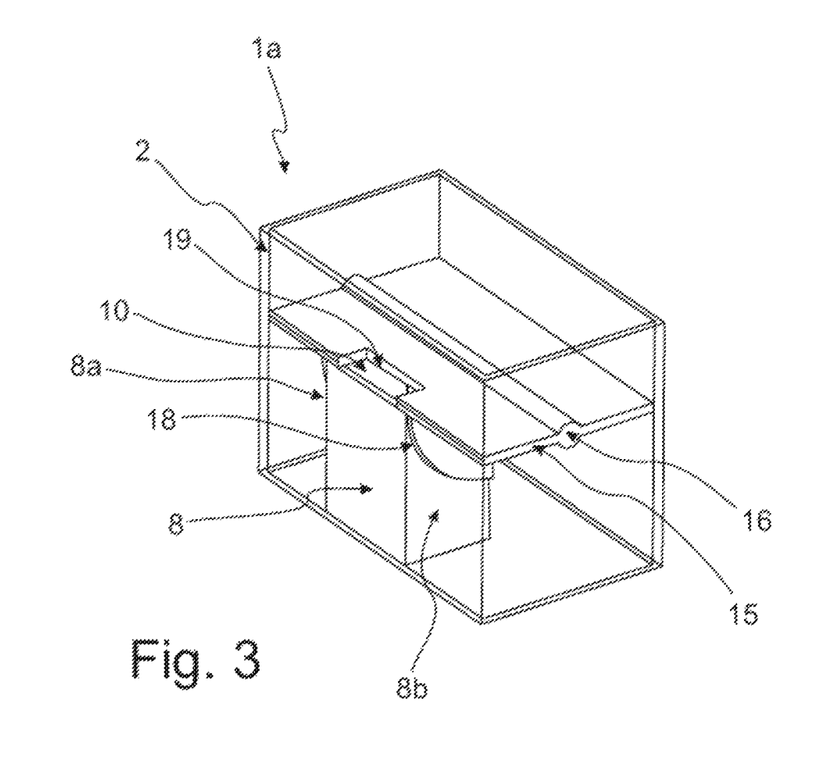
FIG. 3: a portion of a heating and air conditioning system according to one embodiment example of the invention, in which the warm air duct cannot be completely closed by the mode control damper.

FIG. 3 shows a schematic illustration of a second exemplary embodiment of the region of housing 2 of a heating and air conditioning system 1 according to the invention, which comprises warm air duct 8 and mode control damper 15 having circular segment-shaped lateral segments 18. The difference of this assembly, which is otherwise identical to that of the embodiment shown in FIG. 2, is that the door leaf of mode control damper 15 has a rectangular opening 19, which prevents warm air duct discharge opening 10 from being completely closed even when the mode control damper is in the closed state in which mode control damper 15 rests against the sealing surface of warm air duct 8.

Figure 4:
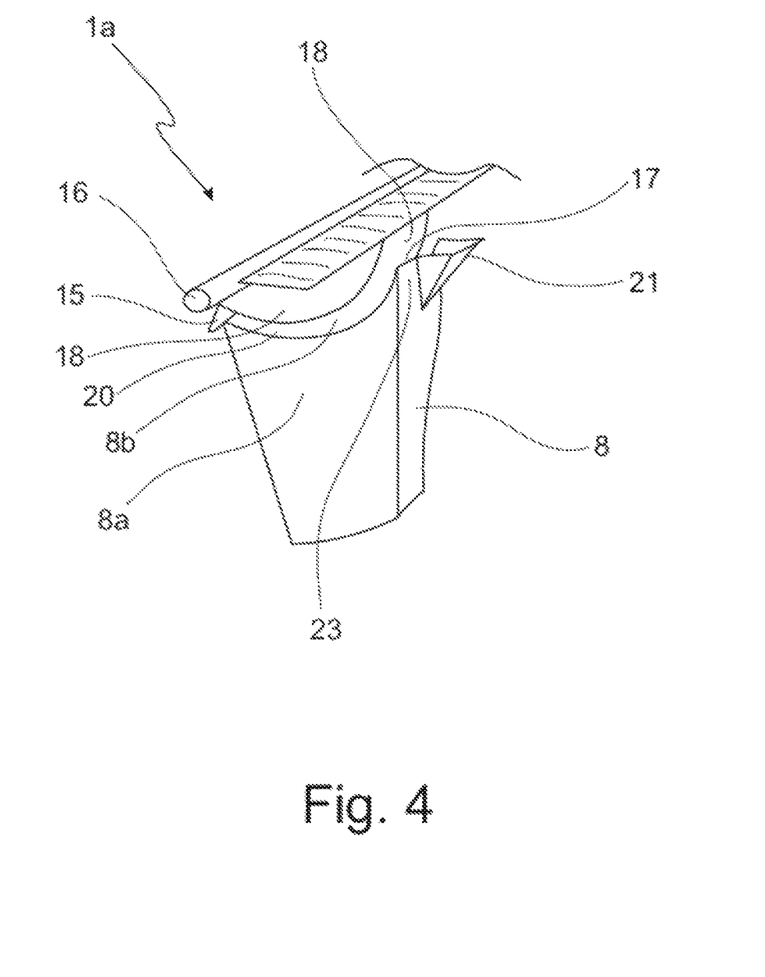
FIG. 4: a portion of a heating and air conditioning system according to the invention having a warm air duct, a mode control damper, and baffle plates.
Figure 5:
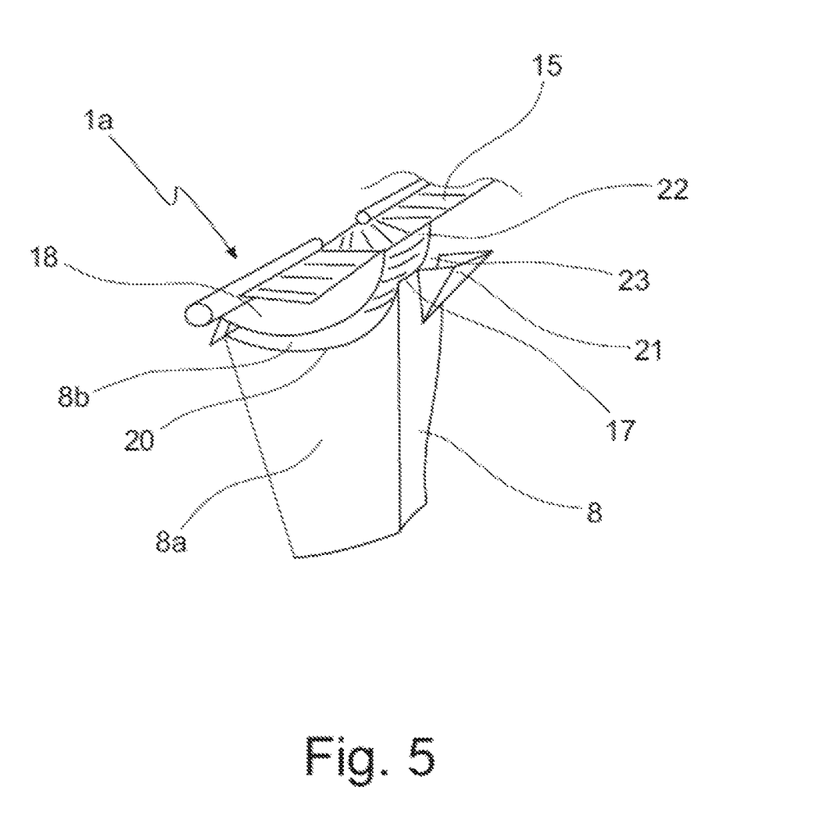
FIG. 5: a portion of a heating and air conditioning system according to the invention having a mode control damper in which the hollow space is filled (this may also be accomplished by a depression on the other side of the mode control damper)

Additional embodiment examples of a combination according to the invention of a mode control damper, the defroster damper, and a warm air duct are illustrated in FIGS. 4 and 5, each of which shows a region 1a of a heating and air conditioning system. In these variants, warm air duct discharge opening 10 extends in the housing (not shown) from one housing wall up to an opposite housing wall.

FIGS. 4 and 5 each show an assembly having a warm air duct 8 and an associated mode control damper 15 with two lateral segments 18. In contrast to the embodiments shown in FIGS. 2 and 3, the circular segment-shaped lateral segments 18 are attached and positioned on mode control damper 15 in such a way that, as mode control damper 15 rotates, the segments do not pass by warm air duct 8, and instead move in the area above half-moon shaped cutouts 20, formed as complementary to the respective circular arc regions of the lateral segments, in side walls 8a, 8b of warm air duct 8 at warm air duct discharge opening 10. The opposing housing walls (not shown) are oriented parallel to rotational axis 16 of mode control damper 15.

In each of the two embodiments shown in FIGS. 4 and 5, a baffle plate 21 is formed on warm air duct 8, which conducts a portion of the air flow from warm air duct 8 so as to bypass mode control damper 15. In addition, in the embodiment shown in FIG. 5, the intermediate space between the two lateral segments 18 at warm air duct 8 is provided with a filler 22. As an alternative to the filler, the intermediate space between the two adjacent lateral segments 18 may also be filled by a depression on the opposite side of the door leaf of the mode control damper.

In all of the above-described embodiments, the volume of air exiting warm air duct 8 can be controlled by adjusting the defroster damper as mode control damper 15, and thus dependent on the operating mode setting.

As is also apparent from the examples described in FIGS. 4 and 5, it is not critical to the invention for mode control damper 15 to completely close warm air duct 8. Thus an opening or a small distance between warm air duct discharge opening 10 and mode control damper 15 may also be provided in the closed state. In particular, small intermediate spaces 23 may be formed in each case between warm air duct discharge opening 10 and mode control damper 15 in the closed state. In FIGS. 4 and 5, such an intermediate space 23 is designed, for example, in the form of an opening 23 on sealing edge 17 of warm air duct discharge opening 10, against which mode control damper 15 rests.

The advantage of the present invention is particularly evident in a comparison of the defrost/foot mode with the foot/mode. The analysis was performed using computational fluid dynamics (CFD).

Figure 6:
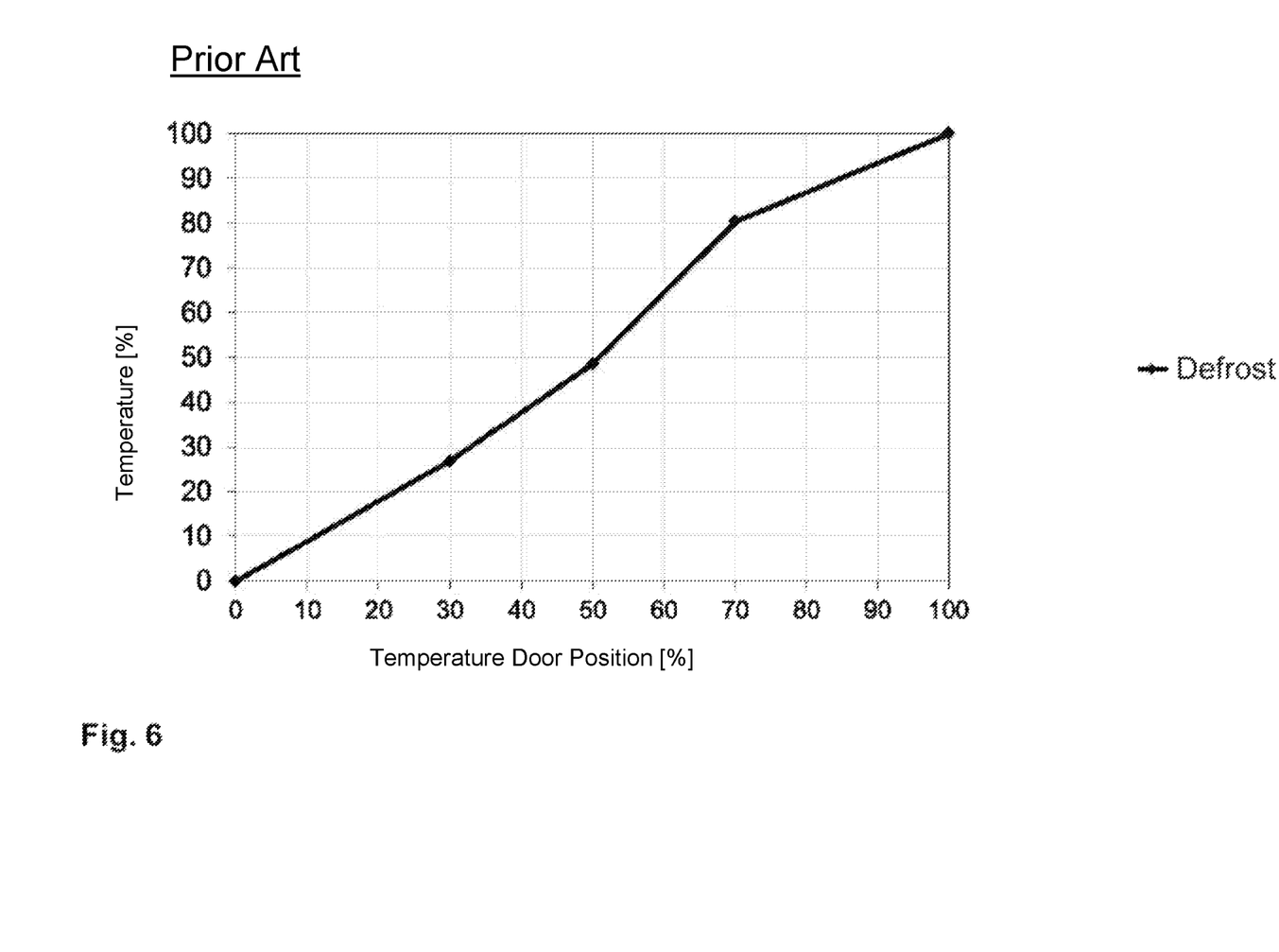
FIG. 6: a diagram illustrating the temperature curve as a function of the position of the temperature damper, obtained in the defrost/foot mode in an assembly of the prior art.
Figure 7:
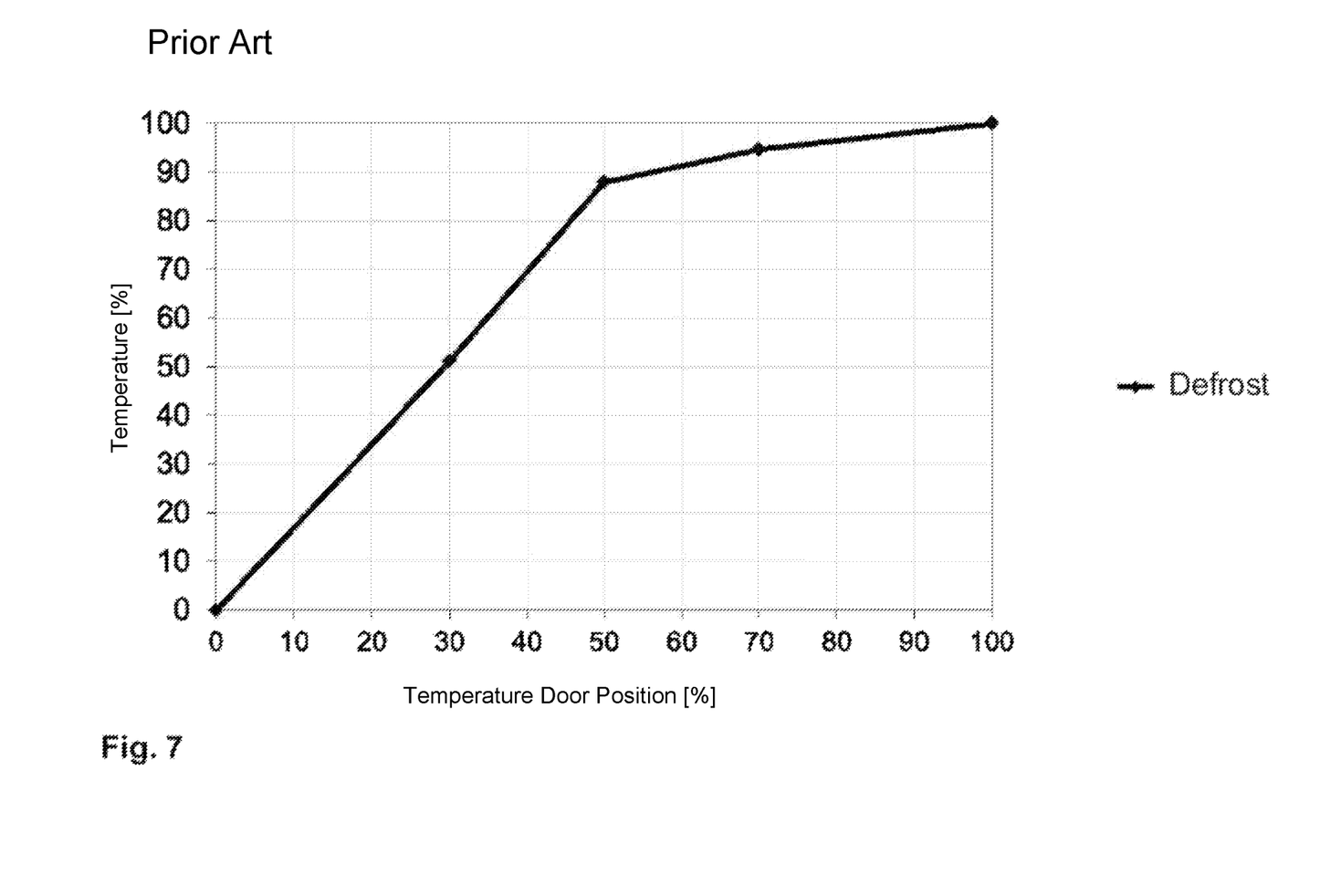
FIG. 7: a diagram illustrating the temperature curve as a function of the position of the temperature damper, obtained in the foot mode in an assembly of the prior art.

The temperature curves shown in FIG. 6 and FIG. 7, which were obtained as a function of the position of the temperature damper, are for an assembly of the prior art comprising a mode control damper and a warm air duct.

FIG. 6 shows the temperature curve as a function of the position of the temperature damper, obtained in the defrost/foot mode. FIG. 7 shows the temperature curve as a function of the position of the temperature damper, obtained in the foot mode.

Figure 8:
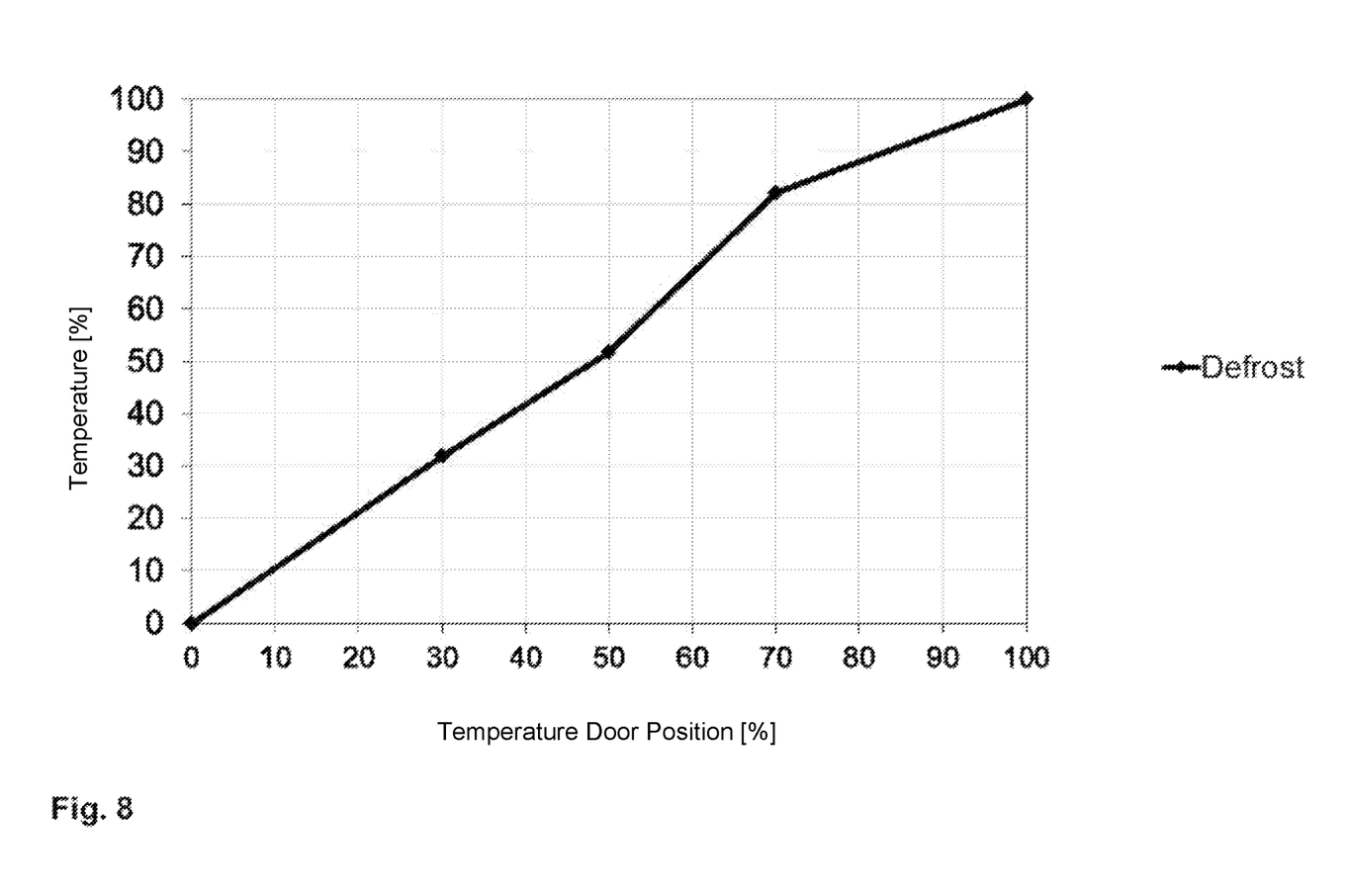
FIG. 8: a diagram illustrating the temperature curve as a function of the position of the temperature damper, obtained in the defrost/foot mode in an assembly according to the invention.
Figure 9:
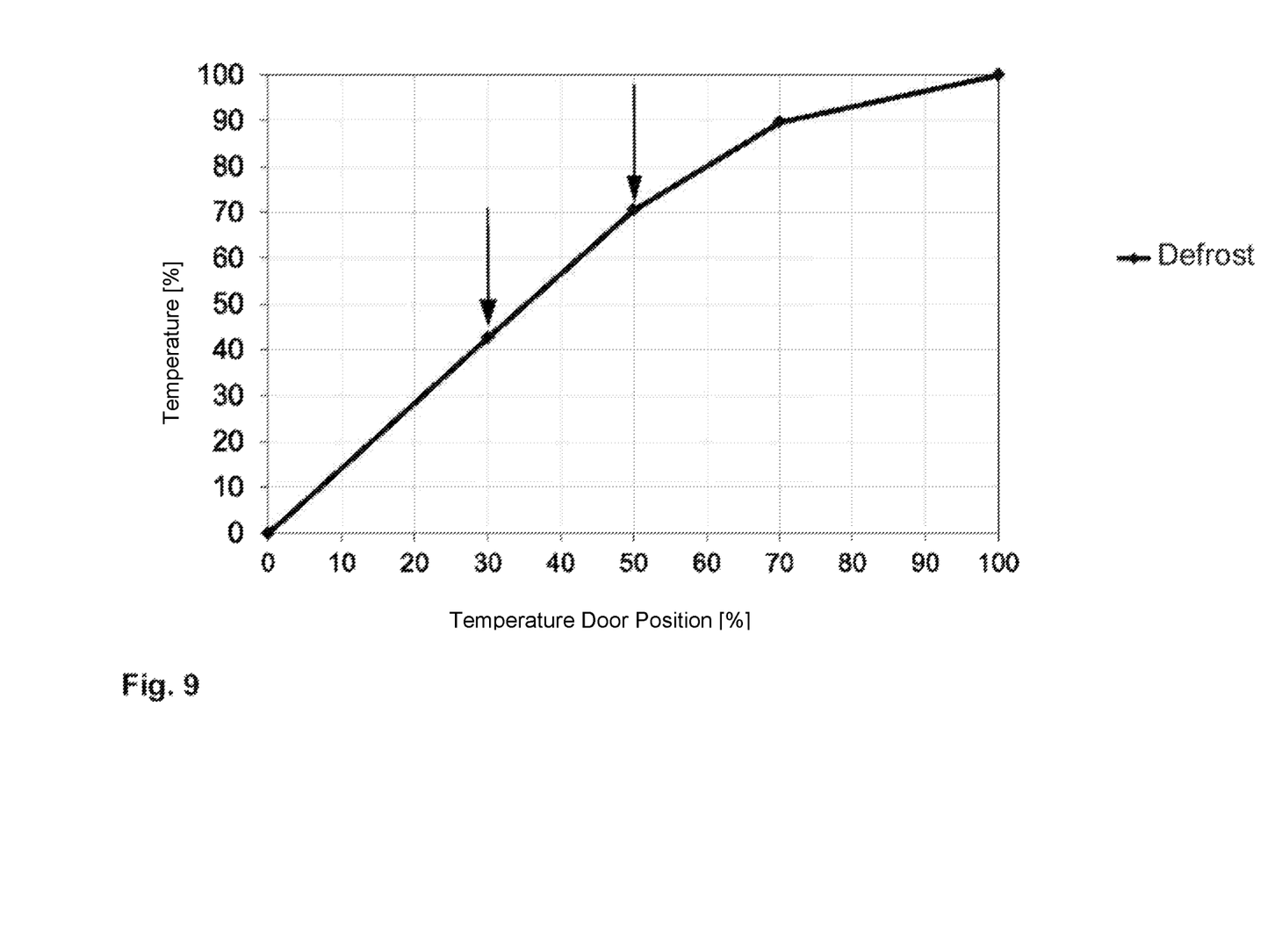
FIG. 9: a diagram illustrating the temperature curve as a function of the position of the temperature damper, obtained in the foot mode in an assembly according to the invention.

The temperature curves shown in FIG. 8 and FIG. 9, which were obtained as a function of the position of the temperature damper, are for an assembly according to the invention comprising a mode control damper and a warm air duct.

FIG. 8 shows the temperature curve as a function of the position of the temperature damper, obtained in the defrost/foot mode. FIG. 9 shows the temperature curve as a function of the position of the temperature damper, obtained in the foot mode.

A comparison of the curves in FIG. 7 and FIG. 9 reveals a significant improvement in terms of the temperature increase in the foot mode for the assembly according to the invention. In other words, FIG. 9 shows that, in the assembly according to the invention, as the temperature damper is opened in the foot mode, the temperature at the defrost outlet no longer increases as abruptly as in a prior art assembly, as shown in FIG. 7. It is thereby possible to control the temperature of the defrost outlet dependent on the mode.

LIST OF REFERENCE SIGNS

1 heating and air conditioning system
1a region of a heating and air conditioning system
2 housing
2a housing wall
3 defrost outlet, air outlet
4 dashboard outlet, air outlet
5 footwell outlet, air outlet
6 evaporator
7 heating heat exchanger
8 warm air duct
8a side wall of warm air duct 8
8b side wall of warm air duct 8
9 warm air duct intake opening
10 warm air duct discharge opening
11 mode control damper, rotatable defroster damper (prior art)
12 means for controlling air flow
13 baffle plates
14 temperature dampers
15 mode control damper (at warm air duct discharge opening)
15a section of door leaf of mode control damper
15b section of door leaf of mode control damper
16 rotational axis
17 sealing edge (against which mode control damper rests in the closed state)
18 lateral segments
19 opening (in mode control damper 15)
20 cutouts in the side walls of the warm air duct at the warm air duct discharge opening
21 baffle plates
22 filler between lateral segments 18
23 opening in warm air duct 8, intermediate space

What is claimed is:

1. A heating and air conditioning system for a motor vehicle, the system comprising:
    a housing having an air outlet,
    a heating heat exchanger or a heater disposed inside the housing and across which a warm air path extends, wherein air flowing through the warm air path is heated as it passes the heating heat exchanger or the heater;
    a warm air duct having a warm air intake opening and a warm air duct discharge opening disposed downstream of the heating heat exchanger or the heater, the warm air duct channeling a partial flow of warm air from the warm air path to the air outlet; and
    a mode control damper rotatable about a rotational axis and connected downstream of the warm air duct in a direction of flow, wherein the at least one air outlet may be selectively opened completely or partially, and in a closed state may be partially or completely closed, wherein the mode control damper and the warm air duct are arranged wherein the mode control damper functions simultaneously as a control damper for controlling a volume of air exiting the air outlet and the warm air duct discharge opening, and wherein the mode control damper has, on a side facing the warm air duct discharge opening, two spaced apart lateral segments configured to block a flow of air outward and inward parallel to the rotational axis in a region of the warm air duct discharge opening, over an entire adjustment range of the mode control damper;
    wherein the warm air duct discharge opening extends from the rotational axis of the mode control damper to an opposing sealing edge of the warm air duct against which the mode control damper rests in the closed state, the sealing edge spaced from the rotational axis in a direction perpendicular to the rotational axis.

2. The heating and air conditioning system according to claim 1, wherein the warm air duct discharge opening extends between the rotational axis of the mode control damper and a housing wall of the housing.

3. The heating and air conditioning system according to claim 1, wherein, as the mode control damper rotates, the segments of the mode control damper pass outside of the warm air duct alongside walls of the warm air duct disposed opposite one another and oriented perpendicular to the rotational axis.

4. The heating and air conditioning system according to claim 1, wherein the warm air duct discharge opening extends alongside walls of the warm air duct, the walls arranged opposite one another and oriented perpendicular to the rotational axis, from a first housing side up to a second, opposite housing side of the housing, wherein the lateral segments are attached and positioned on the mode control damper wherein as the mode control damper rotates about the rotational axis, the segments move in cutouts in the walls of the warm air duct at the warm air duct discharge opening, and wherein each of the cutouts is formed as complementary to the lateral segments.

5. The heating and air conditioning system according to claim 1, wherein at least one of the mode control damper and the warm air duct has one or more openings and a distance is provided between the warm air duct discharge opening and the mode control damper in the closed state, as a result of which the warm air duct discharge opening is not completely closed, even when the mode control damper is in the closed state.

6. The heating and air conditioning system according to claim 1, further comprising at least one baffle plate formed on the warm air duct, the at least one baffle plate conducting a portion of an air flow from the warm air duct to bypass the mode control damper.

7. The heating and air conditioning system according to claim 1, wherein an intermediate space between the lateral segments is provided with a filler.

8. The heating and air conditioning system according to claim 1, wherein an intermediate space between the lateral segments is filled by a depression on an opposite side of the mode control damper.

9. The heating and air conditioning system according to claim 1, wherein the warm air duct supplies warm air to a defrost outlet, and the mode control damper is a defroster damper.

10. The heating and air conditioning system according to claim 1, wherein any air exiting the warm air duct through the warm air duct discharge opening passes through a boundary having a perimeter defined by cooperation of the sealing edge, an edge of a first one of the lateral segments, an inner surface of the mode control damper, and an edge of a second one of the lateral segments.

* * * * *